United States Patent [19]

Denis et al.

[11] Patent Number: 4,465,609

[45] Date of Patent: Aug. 14, 1984

[54] METHOD OF OPERATING A HEAT PUMP OR A THERMAL ENGINE WITH A CHLORO-FLUORINATED HYDROCARBON HAVING AN INCREASED THERMAL STABILITY

[75] Inventors: Jacques Denis, Tassin La Demi-Lune; Jerome Weill, Lyons; Alexandre Rojey, Garches, all of France

[73] Assignee: Institut Francais du Petrole, Rueil-Malmaison, France

[21] Appl. No.: 407,218

[22] Filed: Aug. 11, 1982

[30] Foreign Application Priority Data

Aug. 11, 1981 [FR] France ................................ 81 15664

[51] Int. Cl.$^3$ .............................................. C09K 5/04
[52] U.S. Cl. ................................... 252/67; 252/78.1;
62/324.1; 62/324.4; 570/134; 165/1
[58] Field of Search ................ 252/67, 78.1; 62/324.1, 62/324.4; 570/134; 165/1

[56] References Cited

U.S. PATENT DOCUMENTS 2,365,516  12/1944  Benning et al. ..................... 570/134
4,065,937   1/1978  Burger et al. ....................... 62/324.1

Primary Examiner—John E. Kittle
Assistant Examiner—Robert A. Wax
Attorney, Agent, or Firm—Millen & White

[57] ABSTRACT

A method of operating a heat pump or a thermal engine with the vaporization and the condensation of a heat transfer fluid. The fluid is a chlorofluorinated hydrocarbon with 2 or 3 carbon atoms, a hydrogen atom, at least one chlorine atom per molecule and at most one chlorine atom per carbon atom, with the remainder consisting of fluorine, and said fluid having a critical temperature of at least 140° C.

7 Claims, No Drawings

METHOD OF OPERATING A HEAT PUMP OR A THERMAL ENGINE WITH A CHLORO-FLUORINATED HYDROCARBON HAVING AN INCREASED THERMAL STABILITY

BACKGROUND OF THE INVENTION

This invention relates to a method of operating a heat pump or a thermal engine with certain chloro-fluorinated hydrocarbons used as fluids for heat transfer at relatively high temperature levels.

The necessity to recover at the best various heat discharges results in the extending use of thermodynamic cycles operated with organic fluids. The heat discharges may be upgraded, in particular, either with heat pumps producing heat at a higher thermal level, or with engine cycles vaporizing an organic fluid under pressure, expanding it in a motor with production of mechanical and/or electrical energy and then condensing it at a lower pressure (Rankine cycle).

Certain chloro-fluorinated hydrocarbons, such as those complying with the formulas $CF_3-CCl_2-CF_3$ (F-216), $CF_2Cl-CFCl_2$ (F-113) and $CF_2Cl-CF_2Cl$ (F-114), have been selected up to now from the products of the trade for this use, in view of their advantageous thermodynamic characteristics.

It is recalled that the fluorinated hydrocarbons are conventionally designated by a 3-figure number (preceded by the letter F or R), according to the following code:

the first figure represents the total number of carbon atoms less one (this figure is not given when it equals zero, zero corresponding in that case to one carbon atom);

the second figure represents the total number of hydrogen atoms plus one;

the third figure represents the number of fluorine atoms.

However, the increasing use of plants for upgrading thermal discharges (heat pumps or motors) in the industry, as well as the effort to obtain improved performances, lead to the use of relatively high temperatures.

The problems to be faced are linked to the fact that the organic fluids, such as chloro-fluorinated hydrocarbons proposed up to now decompose, usually under the effect of heat and metals, in the presence of the lubricants used in the mechanical parts of the heat pumps and motors, even when these lubricants have been selected from the best synthesis products, such as, for example, olefin oligomers or certain alkylbenzenes.

It has now been found that certain chloro-fluorinated hydrocarbons have a sufficient stability for use in plants operated at high temperatures without suffering from the above disadvantages. The temperatures used are, for example, higher than 80° C.

SUMMARY OF THE INVENTION

The chloro-fluorinated hydrocarbons which can be used as heat transfer fluids according to the invention, may be defined generally as comprising:

2 to 3 carbon atoms per molecule, one hydrogen atom per molecule, at least one chlorine atom per molecule and at most one chlorine atom per carbon atom, each of the remaining valences (on the carbon atoms of the molecule) being occupied with a fluorine atom.

They must also have a critical temperature sufficient to permit their use in plants operated at high temperatures.

DETAILED DISCUSSION OF THE INVENTION

Thus, the invention includes the chloro-fluorinated hydrocarbons having a critical temperature of at least about 140° C.

In agreement with the conventional rules, the chloro-fluorinated hydrocarbons which comply with these conditions are those designated as F-226, F-123, F-225 and F-224.

Their critical temperatures are respectively 163°, 184°, 221° and 282° C., (values calculated by correlation). These chloro-fluorinated hydrocarbons can advantageously be used in heat pumps at condensation temperatures of at least 100° C.

More particularly, the selected heat pump cycle may operate at a vaporization temperature of about 80° C., (or more) and a condensation temperature of about 120° C. (or more).

The most advantageous chloro-fluorinated hydrocarbons, with respect to their thermodynamic properties, are F-226 and F-123, with preference being however given to the latter.

These chloro-fluorinated hydrocarbons may be obtained by substituting a hydrogen atom for a chlorine atom in a molecule of a chloro-fluorinated hydrocarbon comprising two chlorine atoms on the same carbon atom. Thus the compounds referenced F-123, 224, 225 and 226 may be prepared respectively from the chloro-fluorinated hydrocarbons F-113, 214, 215 and 216, by heating in the presence of one or more liquid hydrocarbons, and with iron used as a catalyst. It appears that the conversion reaction operates according to a radical mechanism, which may be represented by the following diagram:

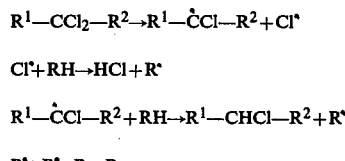

where
$R^1$ represents a $CF_3-$ or $CF_2Cl-$ radical,
$R^2$ represents a F atom or a $CF_3-$ or $CF_2Cl$ radical
and R represents a hydrocarbon radical.

The following examples illustrate the invention. They must not be considered as limitative in any respect.

EXAMPLE 1

The fluorinated hydrocarbon designated as F-123 and complying with the formula $CF_2Cl-CHFCl$ is prepared by heating the fluorinated hydrocarbon F-113 of the formula $CF_2Cl-CFCL_2$ at 200° C. in the presence of iron as a catalyst.

The resultant product (F-123) is then heated in a sealed tube for 7 days at 200° C., in the presence of a cast iron test piece, in contact with an oil consisting of polydecene having a viscosity of 39 mm²/s at 100° C.

A sample of the product F-113 is subjected to the same treatment and the properties of the products obtained after the test are compared (see Table I below).

TABLE I

| CHARACTERISTICS AFTER THE TEST | FLUORINATED HYDROCARBON | |
|---|---|---|
| | F 123 | F 113 |
| Purity of the fluid (%) | 98 | 78 |
| Acid number of the fluid (mg KOH/g) | 0 | 105 |
| Aspect of the oil | CLEAR | BLACK |
| Acid number of the oil (mg KOH/g) | 0 | 8 |
| Aspect of the cast iron test piece | unaltered | strongly attacked |

The product F-123 has an excellent thermal stability although its molecule contains chlorine atoms.

It has also thermodynamic properties which make it useful as fluid for transferring heat at a high temperature level.

Thus, its boiling temperature is 28° C. and its critical temperature 184° C. These characteristics make its use advantageous as a substitute for F-114 which is conventionally used in heat pumps at relatively high condensation temperatures, of 100° C. or more.

For example, it can be advantageously used in a cycle operating at a vaporization temperature of 80° C. and a condensation temperature of 120° C.

The following Table II shows the working conditions of a heat pump equipped with a lubricated reciprocating compressor driven by an electrical motor as compared with the working conditions of F-114 in the same heat pump.

TABLE II

| | F-123 | F-114 |
|---|---|---|
| Suction pressure (atm) | 4.66 | 9.20 |
| Exhaust pressure (atm) | 11.71 | 20.90 |
| Performance coefficient | 5.01 | 4.08 |

It is observed that the use of F-123 results in a substantial increase of the performance coefficient (defined as the ratio of the thermal power delivered by the heat pump to the electrical power consumed by the driving engine) and leads to satisfactory values of the suction and exhaust pressures (these pressures are higher than the atmospheric pressure but lower than in the case of F-114).

EXAMPLE 2

The chloro-fluorinated hydrocarbon, designated as F-226 and complying with the formula $CF_3-CHCl-CF_3$, is manufactured by heating at 200° C. the fluorinated hydrocarbon F-216 of the formula $CF_3-CCl_2-CF_3$, in the presence of an iron catalyst and in contact with a hydrocarbon oil.

The resultant product (F-226) is then heated at 200° C. in the presence of a cast iron test piece, in contact with an oil consisting of polydecene having a viscosity of 39 mm$^2$/s at 100° C., and in a sealed tube for 7 days.

A sample of F-216 is subjected to the same treatment and the properties of the products obtained after the test are compared (see Table III below).

TABLE III

| CHARACTERISTICS AFTER THE TEST | FLUORINATED HYDROCARBON | |
|---|---|---|
| | F 226 | F 216 |
| Purity of the fluid (%) | 96 | 1 |
| Acid number of the fluid (mg KOH/g) | 0 | 210 |
| Aspect of the oil | CLEAR | BLACK |
| Acid number of the oil (mg KOH/g) | 0 | 10 |
| Aspect of the cast iron test piece | unaltered | black deposit |

These results confirm the great difference in thermal stability between the monochlorinated hydrogenated product and the dichlorinated product.

The thermodynamic properties of the product F-226 are at least as good as those of F-216, and it can advantageously be used as a fluid for heat transfer at a high temperature level.

Thus, its boiling temperature is 24° C. and its critical temperature 163° C. It can advantageously be used in cycles of heat pumps whose condensation temperature is 100° C. or more.

If, for example, it is used in a cycle operated at a vaporization temperature of 80° C. and a condensation temperature of 120° C., the following working conditions are obtained, with the same heat pump as in the foregoing example, these conditions being compared, in the following Table, with the working conditions of F-114.

TABLE IV

| | F-226 | F-114 |
|---|---|---|
| Suction pressure (atm) | 5.3 | 9.2 |
| Exhaust pressure (atm) | 12.7 | 20.9 |
| Performance coefficient | 4.57 | 4.08 |

The improvement of the performance coefficient resulting from the use of F-226, as compared with F-114, is also important in that case.

The specific suction volume, which is 268 l/kg for F-226, is lower than the specific suction volume for F-123, amounting to 364 l/kg, which may constitute an advantage in the use of F-226 as compared with that of F-123, the final choice of the working fluid for a given application resulting from an overall optimization.

What is claimed is:

1. In a method of operating a heat pump or thermal engine by use of the vaporization and the condensation of a heat transfer fluid, the improvement comprising operating said heat pump or thermal engine with a heat transfer fluid consisting essentially of at least one chlorofluorinated hydrocarbon containing, in its molecule, 2 or 3 carbon atoms, only one hydrogen atom, at least one chlorine atom per molecule and at most one chlorine atom per carbon atom, and a sufficient number of fluorine atoms to saturate remaining valences, said chlorofluorinated hydrocarbon having a critical temperature of at least 140° C., and selected from those designated as F-226, F-225 and F-224, with F-226 conforming to the formula $CF_3-CHCl-CF_3$, F-225 conforming to the formula $CF_3-CHCl-CF_2Cl$, and F-224 conforming to the formula $CF_2Cl-CHCl-CF_2Cl$.

2. A method as in claim 1 wherein said chlorofluorinated hydrocarbon is F-226, conforming to the formula $CF_3-CHCl-CF_3$.

3. A method as in claim 1 wherein the condensation temperature in the heat pump or thermal engine is at least 100° C.

4. A method as in claim 1 wherein said heat pump or engine is operated in a cycle at a vaporization temperature of at least about 80° C. and a condensation temperature of at least about 120° C.

5. A method as in claim 1 wherein said chlorofluorinated hydrocarbon is sufficiently stable when used in a heat pump or thermal engine plants operated in the presence of lubricants at temperatures higher than about 80° C., to avoid decomposition.

6. A method as in claim 1 wherein said heat pump or thermal engine is operated at temperatures greater than about 80° C.

7. A method as in claim 1 wherein said heat pump or thermal engine is operated in the Rankine cycle.

* * * * *